Patented Feb. 28, 1928.

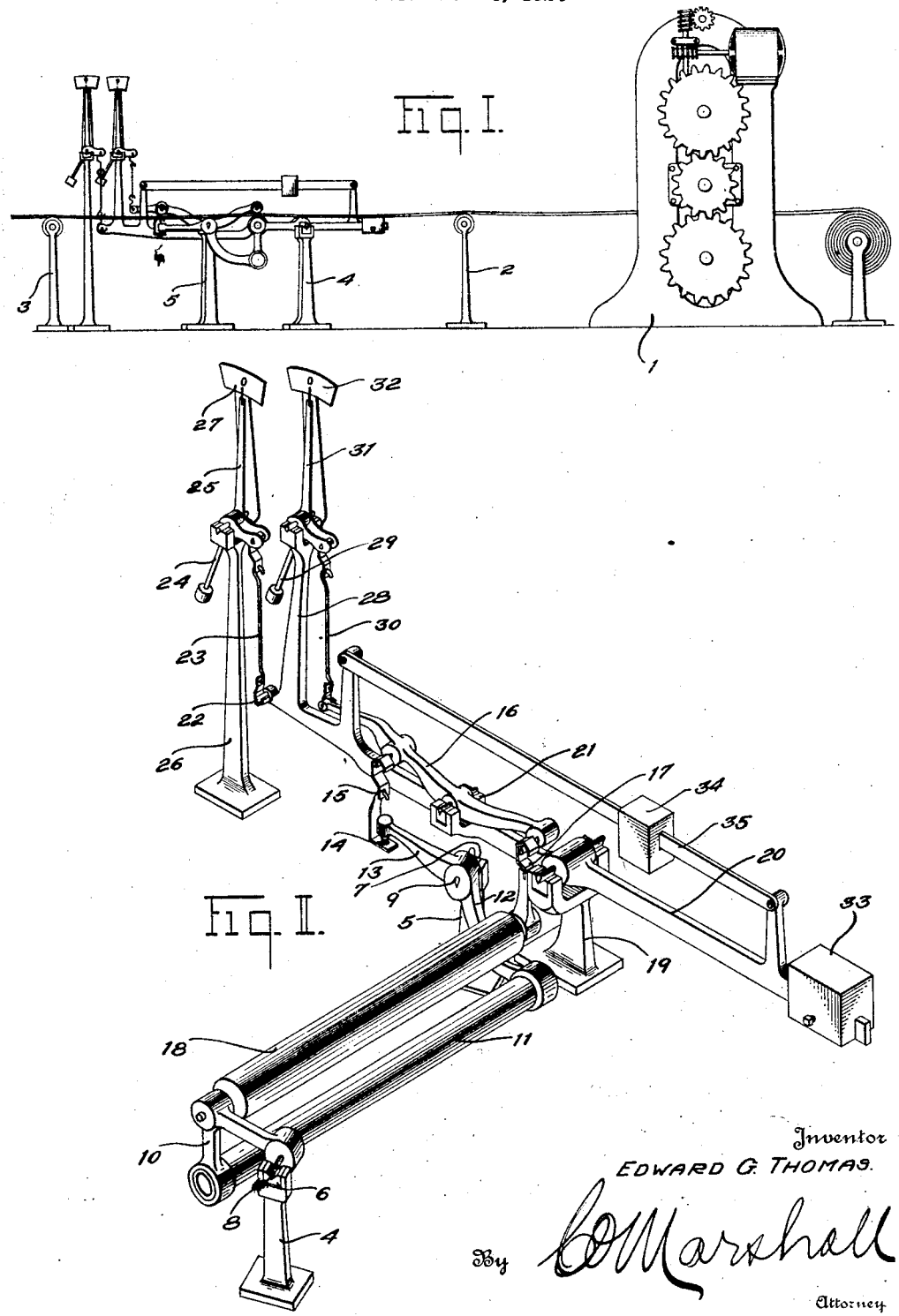

1,660,692

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

TESTING DEVICE.

Application filed November 4, 1924. Serial No. 747,854.

This invention relates to devices for testing the unit of length and the uniformity of weight from side to side of strips of fabric or other flexible material. It is desirable that paper and other manufactured sheet material be of uniform weight and thickness and that the filling or coating of treated or coated fabrics and similar products be evenly distributed over the fabric, paper or other base material to which the coating or filling is applied. Paper making, coating and calendering machines, etc. are commonly equipped with controls by the manipulation of which the thickness of the material or quantity of coating or filling may be increased or diminished and also by which the uniformity of thickness or quantity of treating material applied from side to side of the strip may be regulated.

It is very difficult, however, to detect small variations in the weight of the material or of the filling or coating per unit of length until a considerable length of material has been treated and the treating material set sufficiently so that the length of material can be handled and weighed, and lack of uniformity in the thickness of the material or the application of the coating, especially if the lack of uniformity be from side to side of the strip, cannot always be detected even by weighing a given length of the strip of material. If, for example, a calendering machine be so adjusted that coating is applied to a strip of fabric more thickly at one side of the strip than at the other, the finished product will be defective, but the defect cannot be detected by weighing any given length of the strip.

One of the principal objects of this invention is the provision of a device to indicate whether or not a sheet of material varies in weight from side to side of the sheet.

Another object is the provision of a device for detecting and indicating variations in the total weight per unit of length of a strip of material and for simultaneously detecting and indicating variations in weight of the strip from side to side.

Another object is the provision of a testing device having means for detecting variations in the pressure on a roller or other load receiver and means for indicating variations in pressure from side to side thereof.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a somewhat diagrammatic elevational view of a device embodying my invention, showing the same operating in conjunction with a calendering machine; and Figure II is a view in perspective of the testing and indicating mechanism.

Referring to the drawings in detail, the calender or strip treating machine 1 is of common form and is provided with means for varying the total amount of treating material applied to the strip and also for varying the amount from side to side. As the strip is withdrawn from the calender 1 it passes over a pair of supports 2 and 3 which, as shown, consist of stands supporting rollers, the upper surfaces of which are tangent to the same horizontal plane. The testing and indicating mechanism is arranged to operate upon the portion of the strip of material extending between the supports 2 and 3. As shown in the drawings, fulcrum stands 4 and 5 having aligned V-groove bearings 6 and 7 are located at each side of the strip. Supported upon the bearings 6 and 7 by means of knife edge pivots 8 and 9 is a lever consisting of an angle member 10, a bar 11 fixed at one end to the angle member 10, an arm 12 being rigidly secured to the other end of the bar. The pivots 8 and 9 are fixed in the angle member 10 and arm 12 respectively.

The arm 12 is provided with an extension 13 having a cone pivot 14 at its end which is connected by means of links 15 to a pivot at one end of an even arm lever 16. The other end of the even arm lever 16 is connected by means of links 17 to one end of a load receiving roller 18, the other end of which is mounted on anti-friction bearings in the angle member 10, the mountings at the ends of the roller 18 being such as to permit of limited universal movement.

Fulcrumed upon a fulcrum stand 19 located adjacent the stand 5 is a lever 20 which pivotally supports by means of the knife edge pivotal connection 21 the even arm lever 16, so that a load applied to the load receiving roller 18 is transmitted through the lever 16 to the lever 20. The nose 22 of the lever 20 is connected by means of linkage 23 to a load counterbalancing pendulum 24 which is provided with an indicator 25, the pendulum 24 being fulcrumed on a stand 26 to which is secured a chart 27 for co-operation with the indicator 25. The lever 20 also carries an upright 28 upon which is fulcrumed a pendulum 29 connected by means of linkage 30 to the lever 16. The pendulum 29 is provided with an indicator 31 that co-operates with a chart 32 supported by the upright 28. A counterbalance 33 mounted on the lever 20 serves to counterbalance the weight of the parts carried by the lever on the opposite side of its fulcrum, and a poise 34 mounted on a beam 35 also carried by the lever 20 may be adjusted to bring the mechanism into position to cause the indicator 25 to register with a correct weight mark on the chart 27 when the proper load is applied to the load receiving roller 18.

The parts are so adjusted that when the upper side of the load receiving roller 18 and the upper sides of the supports 2 and 3 are tangent to the same plane the indicators 25 and 31 will register with correct weight marks on the charts 27 and 32.

*Operation.*—In the operation of the device the moving strip of material passes over the supports 2 and 3 and the load receiving roller 18, as shown in Figure I. The poise 34 is adjusted to a position on the beam 35 in which it counterbalances so much of the weight of the strip that when the strip is of the required weight the roller 18 will lie with its upper side in the plane tangent to the supports 2 and 3 and the indicator 25 will register with the mark on the chart 27. If, now, a length of fabric of greater than the required weight pass over the roller 18 the load on the member 10 will be increased and the lever consisting of the members 10, 11 and 12 will be tilted about its fulcrum pivots 8 and 9, pulling downwardly on the links 15. At the same time the downward pull on the links 17 will be increased to the same extent so that the pressure exerted by the lever 16 on its pivotal connection 21 with the lever 20 will be increased and the nose 22 of the lever will move downwardly, causing the pendulum to swing outwardly and the indicator hand 25 to register an over-weight indication on the chart.

If the load on the roller 18 become too light, the effect will be the reverse of that just described—that is to say, the pull upon the links 15 and 17 and the consequent pressure of the lever 16 through its pivotal connection on the lever 20 will be lessened, allowing the pendulum 24 to swing downwardly and cause the hand 25 to register an underweight on the chart.

So long as the increase or decrease in the weight of the strip is uniform from side to side, the indicator hand 31 will remain in registration with the correct weight mark on the chart 32. If, however, the weight of the strip on the side adjacent the angle member 10 become greater than the weight of the strip on the side adjacent the links 17, the pull on the links 15 will be greater than that on the links 17 and the pendulum 29 will be caused to swing about its supporting pivot into position to compensate for the inequality on the links 15 and 17. The position of the indicator hand 25 with respect to the chart 27, therefore, indicates the condition of the total weight of the portion of the strip of material passing over the roller 18, while the position of the indicator hand 31 with respect to the chart 32 indicates the condition of uniformity of weight from side to side of the strip.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, means for supporting a moving strip of material, indicating means for indicating the variations in weight per unit of length of said strip, and a separate indicating device for indicating variations in weight from side to side of said strip and means for operatively connecting each of said indicating means to said supporting means.

2. In a device of the class described, in combination, means including a roller for supporting a moving strip of material, means for supporting said roller at places out of parallelism with said roller, and means co-operating with the roller for indicating variations in weight per unit of length and from side to side of said strip of material.

3. In a device of the class described, in combination, means for supporting a portion of a moving strip of material including a lever, indicating means for indicating variations in weight per unit of length of said strip, means for operatively connecting said indicator to said lever, and means carried by said lever for indicating variations in weight from side to side of said strip.

4. In a device of the class described, in combination, a lever, a member adapted to support a portion of a moving strip of material and an indicating device connected to the lever for indicating variations in weight per unit of length of the strip of material, means for operatively connecting said indicator to said lever, and a separate indicating means carried by said lever for indicating variations in weight from side to side of said strip.

5. In a device of the class described, in combination, a member adapted to support a portion of a moving strip of material, a main lever, an auxiliary lever connected to said main lever, means connecting the respective ends of said strip supporting member to said auxilary lever at separated points, and means co-operating with said main and auxiliary levers for indicating variations in weight per unit of length and variations in weight from side to side of said strip of material.

6. In a device of the class described, in combination, a member adapted to support a portion of a moving strip of material, a main lever, an auxiliary lever supported on said main lever, means connecting the respective ends of the strip supporting member to the auxiliary lever, an indicating device connected to the auxiliary lever for indicating variations in weight from side to side of the strip, and an indicating device connected to the main lever for indicating variations in the weight per unit of length of said strip.

7. In a device of the class described, in combination, a member adapted to extend transversely of and support a longitudinally moving strip of material, means supporting said member at places out of parallelism with the axis of said member, a lever, means connecting the respective ends of said strip supporting member to the lever at separated points, and means connected to said lever for indicating the variations in weight from side to side of said strip.

8. In a device of the class described, in combination, a roller adapted to support a portion of a moving strip of material, means for supporting said roller at two places out of parallelism with the longitudinal axis thereof, a lever, means connecting the roller with said lever, and indicating means connected to the lever for indicating variations in weight per unit of length of the strip.

9. In a device of the class described, in combination, a roller adapted to support a portion of a moving strip of material, means for supporting said roller at two places out of parallelism with the longitudinal axis thereof, a lever, means connecting the respective ends of the roller with said lever at separated points, and indicating means connected to said lever for indicating variations in weight from side to side of said strip.

10. In a device of the class described, in combination, a roller adapted to support a portion of a moving strip of material, means for supporting said roller at two places out of parallelism with the longitudinal axis thereof, a main lever, an auxiliary lever supported on said main lever, means connecting the ends of the roller to said auxiliary lever at separated points, and means connected to said levers for indicating variations in weight per unit of length and from side to side of said strip.

EDWARD G. THOMAS.